United States Patent [19]
Hobaugh, II et al.

[11] Patent Number: 6,038,941
[45] Date of Patent: *Mar. 21, 2000

[54] TELESCOPING TORQUE TRANSMITTING SHAFT ASSEMBLY

[75] Inventors: James M. Hobaugh, II, Lafayette; Mark A. Cartwright, West Lafayette, both of Ind.

[73] Assignee: TRW Inc., Lyndhurst, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/962,015

[22] Filed: Oct. 31, 1997

[51] Int. Cl.⁷ .................................. B62D 1/18; F16D 3/06
[52] U.S. Cl. ........................... 74/493; 280/775; 464/167; 464/180; 384/49
[58] Field of Search .............................. 74/493; 280/775, 280/777; 464/162, 167, 180, 183, 168; 384/49; 403/282, 279, 281

[56] References Cited

U.S. PATENT DOCUMENTS

| | | | |
|---|---|---|---|
| 2,952,145 | 9/1960 | Thompson | 464/167 |
| 3,392,599 | 7/1968 | White | 280/777 |
| 3,696,891 | 10/1972 | Poe . | |
| 3,788,148 | 1/1974 | Connell et al. . | |
| 3,995,916 | 12/1976 | Lange et al. . | |
| 4,006,647 | 2/1977 | Oonuma et al. | 74/492 |
| 4,254,639 | 3/1981 | Teramachi | 464/167 |
| 4,311,027 | 1/1982 | Krude . | |
| 4,384,861 | 5/1983 | Lange et al. . | |
| 4,509,386 | 4/1985 | Kimberlin . | |
| 4,705,491 | 11/1987 | Andersson . | |
| 5,439,252 | 8/1995 | Oxley et al. | 74/193 |
| 5,606,892 | 3/1997 | Hedderly | 74/492 |

FOREIGN PATENT DOCUMENTS

| | | | |
|---|---|---|---|
| 3513340 | 4/1985 | Germany . | |
| 381-329-A | 12/1989 | Germany | 464/167 |
| 56-86229 | 7/1981 | Japan | 464/162 |

*Primary Examiner*—Tamara L. Graysay
*Assistant Examiner*—William C Joyce
*Attorney, Agent, or Firm*—Tarolli, Sundheim, Covell, Tummino & Szabo L.L.

[57] ABSTRACT

An apparatus (10) comprising an outer tubular member (30) having an axis (32). An inner member (90) extends into the outer tubular member (30, 90) and is coaxial with the outer tubular member. The members (30) have surfaces (52a, 102a, 102b) which define a plurality of races (112) spaced circumferentially around one of the members (90). At least one rotatable element (140) is in each of the races (112). The rotatable elements (140) engage the outer tubular member (30) and the inner member (90) and guide relative axial movement of the outer tubular member and the inner member and transmit torque between the outer tubular member and the inner member. One of the members (30) applies radially directed force to the rotatable elements (140) urging the rotatable elements radially into contact with the other member (90) to provide for a no-lash torque transmission between the members. In a preferred embodiment, the one member (30) applies the radially directed force through an elastically deformed portion provided by a plurality of aligned slits (88).

17 Claims, 2 Drawing Sheets

TELESCOPING TORQUE TRANSMITTING SHAFT ASSEMBLY

TECHNICAL FIELD

The present invention relates to a telescoping torque transmitting shaft assembly, and particularly to a telescoping torque transmitting shaft assembly for a steering system of a vehicle.

BACKGROUND OF THE INVENTION

A known steering system for a vehicle includes a steering wheel connected to a steering gear by a telescoping torque transmitting shaft assembly. The telescoping torque transmitting shaft assembly includes an outer member and an inner member which are capable of relative telescoping axial movement. Upon rotation of the steering wheel, torque is transmitted between the telescoping inner and outer members. It is desirable to provide for a no-lash torque transmission between the telescoping inner and outer members.

SUMMARY OF THE INVENTION

In accordance with the present invention, an apparatus comprises an outer tubular member having an axis. An inner member extends into the outer tubular member and is coaxial with the outer tubular member. The inner and outer members have surfaces that define a plurality of races spaced circumferentially around the members. At least one rotatable element is in each of the races and engages the outer tubular member and the inner member. The rotatable elements guide relative axial movement of the outer tubular member and the inner member and transmit torque between the outer tubular member and the inner member. One of the inner and outer members applies radially directed force to the rotatable elements urging the rotatable elements radially into contact with the other of the inner and outer members to provide for a no-lash torque transmission between the inner and outer members.

Preferably, the rotatable element in each race is a ball. Also, preferably the races extend parallel to the axis of the tubular member and are defined in part by flat surfaces on the inner and outer members.

BRIEF DESCRIPTION OF THE DRAWINGS

The foregoing and other features of the invention will become more apparent to one skilled in the art upon consideration of the following description of the invention and accompanying drawings in which.

DESCRIPTION OF THE PREFERRED EMBODIMENTS

The present invention relates to a telescoping torque transmitting shaft assembly that is useful in any application where it is desired to transmit torque between members while at the same time allowing relative axial movement between the members. One application for the telescoping torque transmitting shaft assembly is in a motor vehicle steering system to transmit torque from a steering wheel to a steering gear. The telescoping torque transmitting shaft assembly also acts to allow axial displacement of one member of the steering system relative to another member of the steering system.

Figure 1:
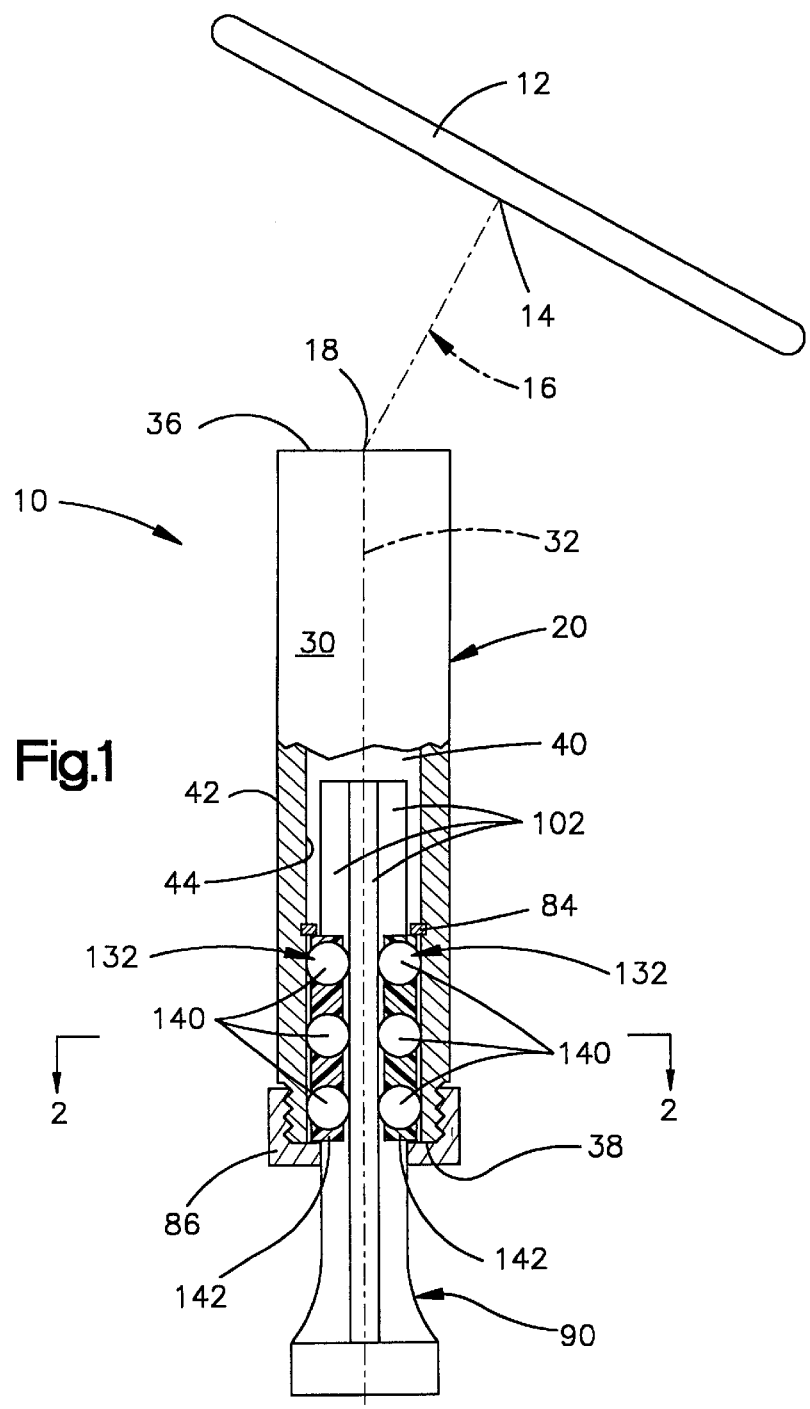
FIG. 1 is a schematic view of a vehicle steering system.

As representative of the present invention, FIG. 1 illustrates a steering assembly 10 for use in a vehicle, such as a truck. The steering assembly 10 includes a steering wheel 12 of any suitable construction. The steering wheel 12 is connected to a first end 14 of a primary steering shaft 16 by any suitable means (not shown). The primary steering shaft 16 is preferably a part of a tilt/telescope steering column that is axially and angularly adjustable to allow for adjustment of the steering wheel 12 relative to the vehicle.

A second end 18 of the primary steering shaft 16, opposite the first end 14, is connected to an intermediate steering column 20 by any suitable means, such as a universal joint (not shown). The intermediate steering column 20 is connected to a steering gear 22 by any suitable means, such as a universal joint (not shown). The primary steering shaft 16 and the intermediate steering column 20 cooperate together to transmit rotational motion from the steering wheel 12 to the steering gear 22 to effect steering of the vehicle.

The intermediate steering column 20 comprises an outer tubular member 30 having a longitudinal central axis 32. The outer member 30 is preferably made of metal and includes a first end 36, a second opposite end 38 and a hollow interior 40. The first end 36 of the outer member 30 is connected to the second end 18 of the primary steering shaft 16. The outer member 30 is defined in part by an outer surface 42 and an inner surface 44 spaced radially inward of the outer surface. The inner surface 44 defines the hollow interior 40.

Figure 2:
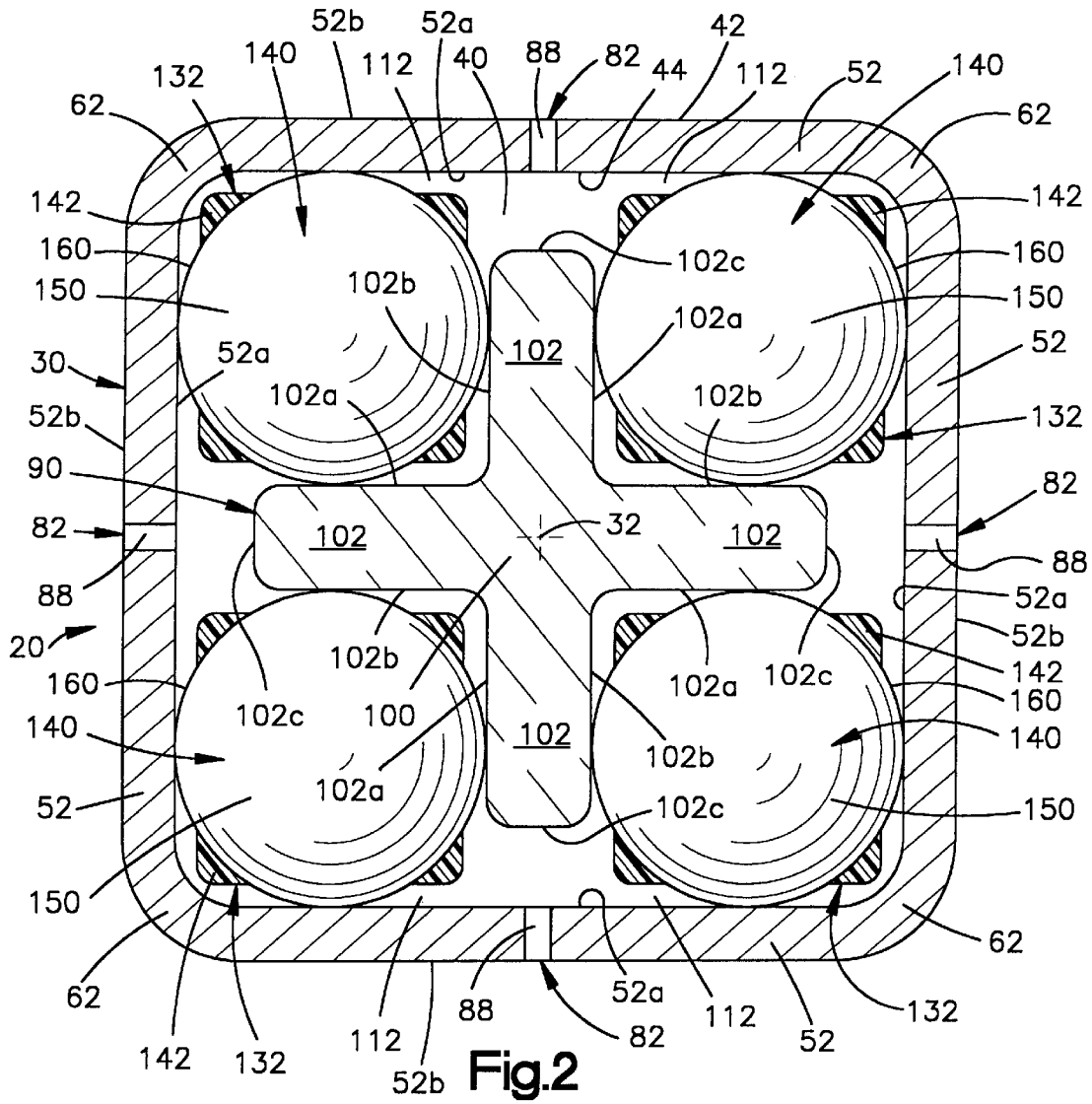
FIG. 2 is a sectional view of the steering system of FIG. 1 taken along line 2—2 of FIG. 1.

In the preferred embodiment, the outer member 30 (FIG. 2) has four sides 52. The four sides 52 of the outer member 30 provide the outer member with a generally square cross-sectional shape, as shown in FIG. 2. Each side 52 has flat inner and outer surfaces 52a and 52b, respectively, extending between and connecting four equally spaced-apart corners 62 of the outer member 30. Thus, the inner surface 44 is generally square, and the hollow interior 40 of the outer member 30 has a generally square cross-sectional shape.

The outer member 30 has a flange portion 84 (FIG. 1) disposed on the inner surface 44 between the first end 36 and the second end 38 of the outer member. The flange portion 84 extends radially inward away from the inner surface 44 of the wall member 40. The flange portion 84 is illustrated as being a snap-in ring. It is contemplated that the flange portion 84 could be any number of other suitable constructions.

Figure 3:
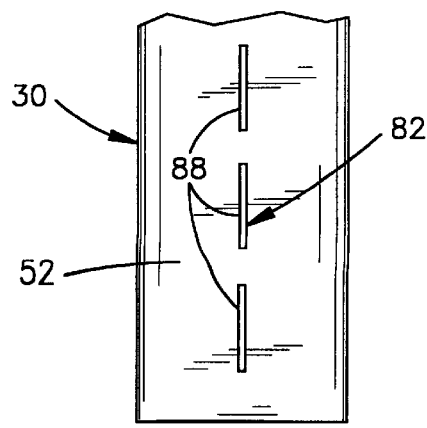
FIG. 3 is a schematic side view of a part of the steering system of FIG. 2.

The outer member 30 has a linear row of slits 82 (FIG. 2) in each of its walls 52 adjacent the second end 38. As illustrated in FIG. 3, each row of slits 82 comprises three slits 88. Each slit 88 in the row of slits 82 extends between the inner and outer surfaces 44 and 42, respectively, and completely through the wall 52 of the outer member 30, as best shown in FIG. 2.

A cover or cap 86 of any suitable construction is connectable to the second end 38 of the outer member 30. The cap 86 has a centrally disposed opening.

The intermediate steering column 20 (FIG. 1) further comprises an inner shaft member 90 having a longitudinal central axis coincident with the central axis 32. Preferably, the inner member 90 is made of metal and comprises a central portion 100 (FIG. 2) having four equally spaced linear arms 102 extending radially from the central portion. Preferably, each of the arms 102 is defined by parallel first and second linear surfaces 102a and 102b, respectively, extending radially from the central portion 100 and a third linear surface 102c extending between and connecting the first and second linear surfaces 102a and 102b, respectively.

The first linear surface 102a of each arm 102 lies in a plane that intersects at a right angle a plane in which the second linear surface 102b of the adjacent arm 102 spaced in the clockwise direction from the first linear surface 102a is located. This arrangement of the surfaces 102a and 102b helps define four longitudinally extending passages or races 112 located between the arms 102 and the sides 52 when the inner member 90 is located in the outer member 30. Each race 112 is essentially defined by a pair of adjacent first and second linear surfaces 102a and 102b, the respective corner 62 of the outer member 30 facing the pair of first and second linear surfaces and portions of the inner surfaces 52a adjacent to the respective corner. The races 112 have axes which preferably extend parallel to the central axis 32. The four races 112 and four arms 102 are thus disposed in a circular array, extending circumferentially around the inner member 90.

The intermediate steering column 20 further comprises four friction reducing assemblies 132. In the preferred embodiment, each friction reducing assembly 132 comprises a plurality of rotatable members, preferably balls 140, rotatably received in one of four linear cages 142. Preferably, each friction reducing assembly 132 includes three balls 140 as shown in FIG. 1. In the preferred embodiment, each linear cage 142 comprises a generally square-shaped hollow wall defined by four wall portions. Each wall portion has a circular opening.

The balls 140 are of a suitable material and are preferably steel. Each ball 140 has a spherical surface 150. The diameters of the balls 140 are the same and are larger than the distance between opposed wall portions of the square-shaped wall of the linear cages 142. Due to the relative dimensions of the linear cages 142 and the balls 140, portions 160 of the spherical surfaces 150 of the balls 140 extend past the exterior, or out of, the linear cages on all four sides of the cages, as best shown in FIG. 2.

One manner of assembling the steering assembly 10 is as described below. The friction reducing assemblies 132 are slid into the outer member 30 until a first end of a linear cage 142 abuts the flange portion 84. After all the cages 142 are inserted, the cap 86 is secured on the second end 38 of the outer member 30. The cap 86 thus abuts a second end of each of the linear cages 142, opposite the first end, so that the friction reducing assemblies 132 are maintained within the outer member 30 axially between the flange portion 84 and the cap 86. The inner member 90 is then slid through the opening in the cap 86 into the hollow interior 40 of the outer member 30 between the friction reducing assemblies 132 to complete assembly of the intermediate steering column 20. The friction reducing assemblies 132 are thus disposed in the outer member 30 radially between the inner member 90 and the outer member 30, respectively.

When the outer member 30 is in its initial condition, the cross-sectional area of the hollow interior 40 of the outer member is not large enough to receive the friction reducing assemblies 132 and the inner member 90 without deformation of the outer member 30. Due to the relative dimensions of the outer member 30, the inner member 90 and the friction reducing assemblies 132, the first and second linear surfaces 102a and 102b, respectively, of the arms 102 of the inner member 90 abut the surfaces 150 of the arcuate balls 140 as the inner member is slid into the outer member. This causes the four sides 52 of the outer member 30, due to the rows of slits 82, to expand elastically outward so that the outer member is deformed outwardly. Thus, the outer member 30 expands radially from an initial condition to a second condition to enable the inner member 90 to move axially into the hollow interior 40 of the outer member.

The outer member 30, due to its elastic expansion from its initial condition, has an inherent tendency to spring back to its initial condition. The outer member 30 thereby applies a radially inwardly directed force on the balls 140 to urge the balls into contact with the inner member 90. The balls 140 are thus maintained abutting the inner member 90 and the outer member 30 to achieve a no-lash torque transmission, i.e., no relative rotational movement between the inner and outer members. This no-lash torque transmission will be maintained over time even with wear of the parts. A predetermined amount of wear will be taken up by the outer member 30 moving from its elastically deformed condition toward its initial condition.

With the friction reducing assemblies 132 abutting the inner member 90 and the outer member 30, the balls 140 rollingly engage the inner and outer members simultaneously. This rolling engagement between the balls 140 and the inner member 90 and the outer member 30, enables the balls to guide relative axial movement of the inner and outer members. During axial movement of the inner member 90 relative to the outer member 30, the balls 140 rotate about their centers. Specifically, each ball 140 rollingly engages the inner surfaces 52a of adjacent sides 52 of the outer member 30 and the first and second linear surfaces 102a and 102b of adjacent arms 102 of the inner member 90. This rolling contact minimizes the force required to move the inner member 90 and the outer member 30 axially with respect to each other. The balls 140 also transmit torque between the inner member 90 and the outer member 30.

From the above description of the invention, those skilled in the art will perceive improvements, changes and modifications. For instance, it is contemplated that the inner member 90 and outer member 30 can be constructed with alternative shapes that define any number of races 112 as long as at least two races, and thus two friction reducing assemblies 132, are provided. Moreover, it is further contemplated that during assembly, the inner member 90 could be placed in the outer member 30 and then the balls 140 could be positioned between the inner and outer members. In that case, insertion of the friction reducing assemblies 132 into position would cause elastic deformation of the outer member 30. Also, it is contemplated that instead of each wall 52 of the outer member 30 having three slits 88, each wall of the outer member could have one elongated slit extending to the second end 38 of the outer member to define four legs of the outer member. The cap 36, when secured to the second end 38 of the outer member 30, would then tie the legs together for strength. Such improvements, changes and modifications within the skill of the art are intended to be covered by the appended claims.

Having described the invention, the following is claimed:

1. An apparatus comprising:

an outer tubular member having an axis, said outer tubular member having a generally square cross-sectional shape;

an inner member extending into said outer tubular member and coaxial with said outer tubular member, said inner member defining a solid, non-tubular central portion having a plurality of equally spaced linear arms projecting radially from said central portion;

said outer tubular member and said inner tubular member having flat surfaces defining a plurality of races spaced circumferentially around one of said members;

at least one rotatable element in each of said races, said rotatable elements engaging said outer tubular member and said inner member and guiding relative axial movement of said outer tubular member and said inner member and transmitting torque between said outer tubular member and said inner member, said at least one rotatable element engaging said flat surfaces of said outer tubular member at only two points and said flat surfaces of said inner member at only two points; and one of said members elastically applying radially directed force to said rotatable elements urging said rotatable elements radially into contact with the other member to provide for a no-lash torque transmission between said members.

2. An apparatus as defined in claim 1 further including a vehicle steering wheel coupled to one of said members to cause rotation of said one member upon rotation of said vehicle steering wheel.

3. The apparatus of claim 2 wherein said steering wheel is coupled to said outer tubular member.

4. The apparatus of claim 1 wherein said at least one rotatable element comprises a ball member.

5. The apparatus of claim 1 wherein said surfaces extend parallel to the axis of said tubular member.

6. The apparatus of claim 5 wherein said member applying radially directed force is said outer tubular member.

7. The apparatus of claim 1 wherein said outer tubular member includes an elastic portion that elastically deforms radially from an initial condition when said rotatable elements and said inner member are located in said outer tubular member.

8. The apparatus of claim 7 wherein said outer tubular member is metallic.

9. The apparatus of claim 1 wherein said one member elastically applying radially directed force includes an elastically deformed portion of said one member which applies said radially directed force.

10. The apparatus of claim 9 wherein said one member elastically applying radially directed force is metallic.

11. The apparatus of claim 10 wherein said one member comprises a plurality of aligned slits through said member which provide the elastically deformed portion.

12. The apparatus of claim 1 wherein said plurality of races extends parallel to said axis.

13. An apparatus comprising: an outer tubular member having an axis;

an inner member extending into said outer tubular member and coaxial with said outer tubular member;

said members having surfaces defining a plurality of races spaced circumferentially around one of said members;

at least one rotatable element in each of said races, said rotatable elements engaging said outer tubular member and said inner member and guiding relative axial movement of said outer tubular member and said inner member and transmitting torque between said outer tubular member and said inner member;

one of said members applying radially directed force to said rotatable elements urging said rotatable elements radially into contact with the other member to provide for a no-lash torque transmission between said members;

said one member applying radially directed force including an elastically deformed metallic portion of said one member which applies said radially directed force; and said one member including a plurality of aligned slits through said member which provide the elastically deformed portion.

14. The apparatus of claim 13 further including a vehicle steering wheel coupled to one of said members to cause rotation of said one member upon rotation of said vehicle steering wheel.

15. The apparatus of claim 13 wherein said at least one rotatable element comprises a ball member.

16. The apparatus of claim 13 wherein said outer tubular member includes an elastic portion that elastically deforms radially from an initial condition when said rotatable elements and said inner member are located in said outer tubular member.

17. The apparatus of claim 13 wherein said plurality of races extends parallel to said axis.

* * * * *